Oct. 6, 1936.    B. SKARAAS ET AL    2,056,490
MEANS FOR INDICATING THE CONTENTS OF SILO BINS,
STORAGE TANKS, AND LIKE CONTAINERS
Filed Jan. 31, 1934

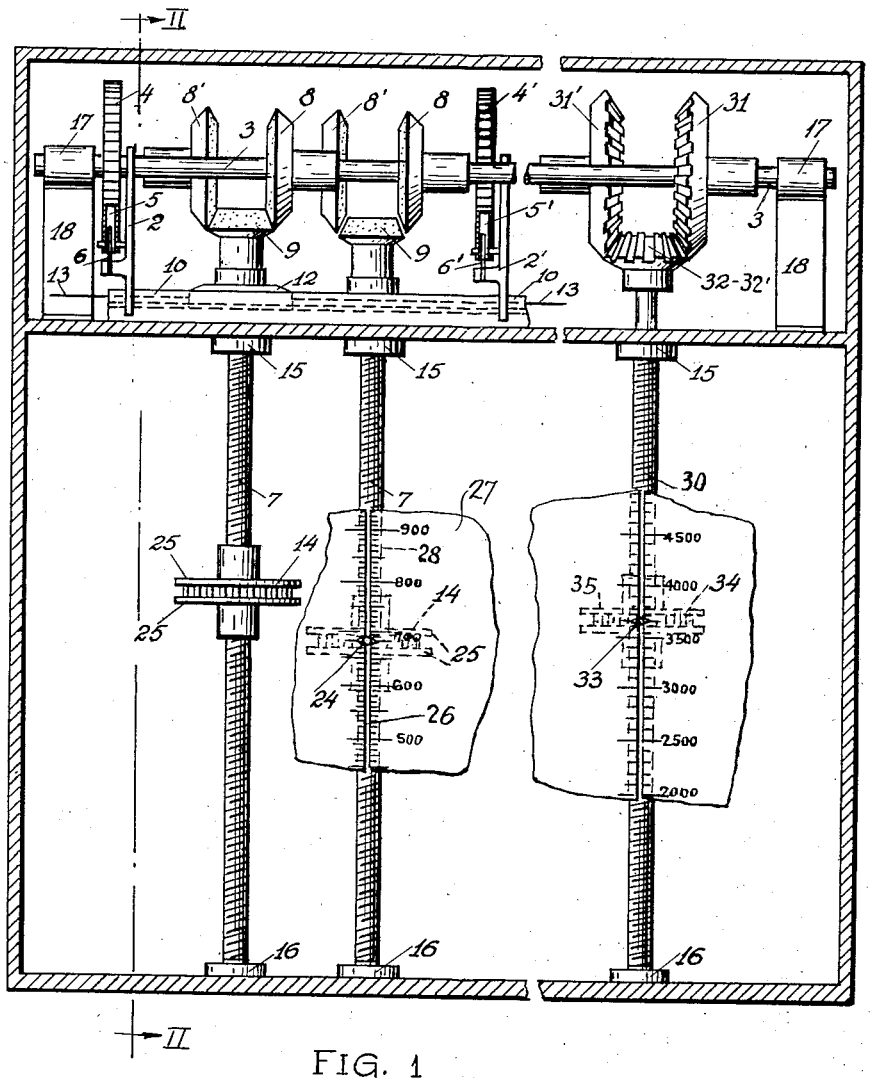
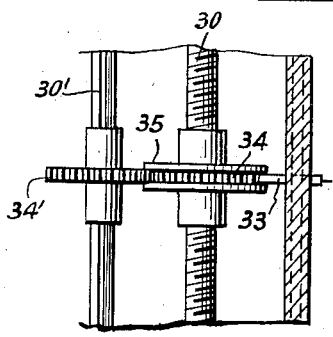
FIG. 1.
FIG. 6.

Inventors:
Bernt Skaraas
Erik Danielsson
by S. Sokal.
Attorney.

Patented Oct. 6, 1936

2,056,490

UNITED STATES PATENT OFFICE 2,056,490

MEANS FOR INDICATING THE CONTENTS OF SILO BINS, STORAGE TANKS, AND LIKE CONTAINERS

Bernt Skaraas and Erik Danielsson, Stavanger, Norway

Application January 31, 1934, Serial No. 709,080
In Norway February 16, 1933

3 Claims. (Cl. 116—114)

This application has been filed in Norway February 16, 1933. The invention relates to means for indicating the contents of silo bins, storage tanks and like containers. The object of the invention is to provide a device which will automatically indicate upon a scale the contents of a particular container at any time, as well as the total contents of a number of containers, which device may be placed at any suitable distance from the containers in question.

Another object of the invention is to provide a device of the above kind adapted to be operated by the machine which serves for weighing the material, for instance grain, before or whilst it is being put into the containers, and the machine which serves for weighing the material taken out of the container, the said machines being hereinafter referred to as the weighing in and weighing out machine respectively. The device may be operated by the weighing in and weighing out machines respectively, through the medium of any suitable electromagnetic or mechanical means, for instance through the medium of a cord which connects suitable members of the machines with a pair of rotatably mounted main shafts, one for the weighing in and one for the weighing out machine which are thus given a rotation corresponding in extent to the oscillation of the weighing machines.

In order to indicate in addition the total contents of all of the containers served by the common indicating devices, the two main shafts are in addition permanently connected operatively with a single pair of shafts arranged similarly to the pairs of shafts corresponding to the individual containers. The movement of these two additional shafts is indicated by means of a pointer on a scale from which the total contents of all the containers may be read at any time. This latter scale has a graduation differing from that of the scales of the individual containers in order to indicate the larger quantities corresponding to the said total contents. One embodiment of the invention is shown in the accompanying drawings in which:

Fig. 1 is an elevation partly in section of the improved indicating device.

Fig. 6 shows parts of the additional shafts for indicating the total contents of all containers.

Figure 2:
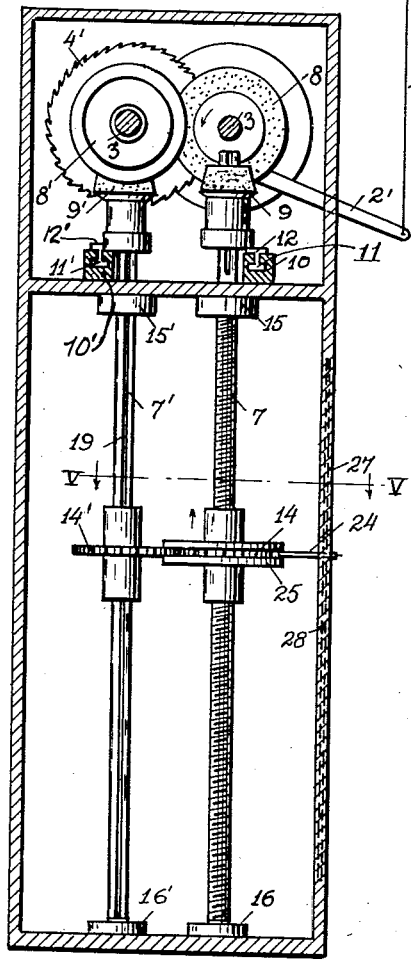
Fig. 2 is a section on line II—II of Fig. 1.

When filling a container the oscillation of the weighing in machine is transmitted by means of a string 1 (see Fig. 3) connected with the machine, to a ratchet lever 2 connected to the other end of the string 1 and rotatably mounted upon a main shaft 3 and engaging by means of a pawl 5 controlled by a spring 6, with a ratchet wheel 4 fixed upon said shaft 3. The shaft 3 is acted upon only on weighing in and is mounted in bearings 17, 17 carried by uprights 18, 18. Another shaft 3' parallel to the shaft 3 is used in connection with the weighing out operation and is mounted in a similar manner in the casing. The shaft 3' is operated by a similar ratchet device 2', 5', 6', 4' shown in Fig. 1, by the weighing out machine. For each individual container a pair of vertical shafts 7, 7' (see Fig. 2), which are associated with the main shafts 3, 3' and are rotatably mounted in top bearings 15, 15' and step bearings 16, 16', is provided. The main shafts carry for each shaft 7, 7' a fixed bevel gear 8, 8', and the shafts 7, 7' are each provided with a slidable friction bevel gear 9, 9' the said bevel gears being slidably splined or keyed to the said shafts 7, 7' and are slidable along the shafts, but not rotatable with regard to the latter. The coupling of the shafts 7, 7' to the shafts 3, 3' is effected by means of coupling members 12, 12' slidable in grooves 11, 11' of horizontal guide members 10, 10'. When weighing into or out of a particular container the required coupling member 12 or 12' is pulled by means of a string 13 into a position wherein it acts upon the corresponding friction wheel 9, 9' so as to couple the required shaft 7 or 7' with its corresponding main shaft 3 or 3'. The string 13 may be returned by a counterweight or spring. Ball bearings are provided for the friction wheels 9, 9' in order to reduce resistance.

Figure 3:
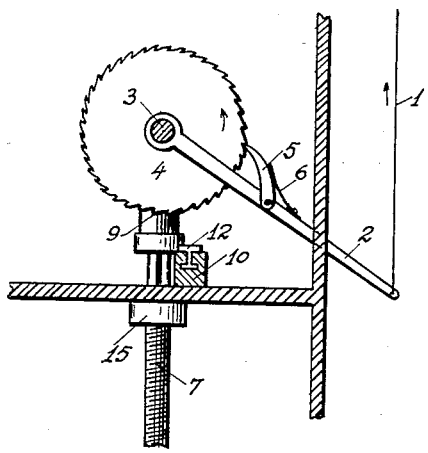
Fig. 3 shows in sectional elevation the device by means of which a main shaft is operated by the weighing machine.

In Fig. 2, one of the shafts 7 is shown coupled to its corresponding shaft 3. Each shaft 7 is screw threaded and carries a toothed wheel 14, the hub of which is internally screw threaded. The toothed wheel 14 engages with a toothed wheel 14' on the corresponding shaft 7', the hub of which wheel 14' having driving or sliding engagement with a groove 19 of its shaft 7' and is slidable along the shaft. The two toothed wheels 14, 14' are connected so as to move simultaneously upwards or downwards, this connection being, in the construction shown, effected by collars 25 of the one gear engaging the other gear. Rotation of one of the shafts 7 by the shaft 3 causes the toothed wheel 14 to be screwed upwards, and at the same time the toothed wheel 14' is carried upwards sliding during this movement along the groove 19 of the shaft 7', which during this operation is stationary. A pointer 24 which extends in between the collars 25 slides correspondingly along a scale 27 on the front of the casing and indicates the change in the contents of the respective silo bin or container. If, on the other hand, one of the shafts 7' be coupled to the main shaft 3' on weighing out, by the aid of the slidable member 12', the rotation of the shaft 7' will cause rotation of the toothed wheel 14' and this, in turn, will rotate the toothed wheel 14. As the shaft 7 is stationary during this operation, the toothed wheel 14 will be screwed down and the pointer 24 will slide upon the scale 27.

Figure 4:
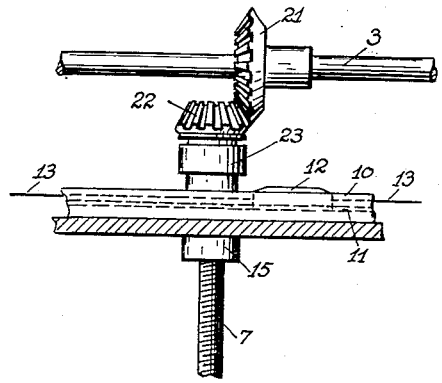
Fig. 4 shows in detail the means for coupling any particular pair of shafts appertaining to a container with the main shafts.

In the modified construction shown in Fig. 4, the friction wheels 8 and 9 are replaced by permanently engaged bevel gears 21 and 22 together with a friction wheel 23 sliding along a groove in the upper end of the shaft 7. Said friction wheel is, by means of the above mentioned sliding member 12, brought into contact with friction surface provided upon the bevel gear 22.

Figure 5:
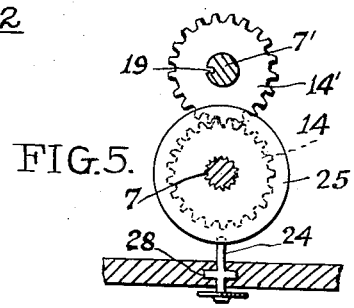
Fig. 5 is a section taken on the line V—V of Fig. 2.

The indexing pointer 24 extends in between the collars 25, and projects through a slot 26 in the casing. The pointer is guided in grooves 28 along the slot 26 (Fig. 5).

In order to indicate simultaneously the total contents of all the containers, a single pair of additional shafts 30, 30' (see Fig. 6) is provided, similar to the shafts 7, 7' of the individual containers. The shafts 30, 30' are interconnected by toothed wheels 34, 34' which are in engagement and are coupled to move simultaneously upwards or downwards, for instance, by means of collars 35, as has been previously described in connection with the shafts 7, 7'. The shafts 30, 30' are permanently coupled with the main shafts 3, 3' by means of bevel gears 31, 31', 32, 32' so as to transmit any rotation of the main shaft 3, 3' to the shafts 30, 30'. Therefore, when the toothed wheels 34, 34' are raised or lowered, an indexing device 33 which projects in between the collars 35 slides up or down along the scale on the front of the casing and indicates the total contents of all the containers at any time. The shaft 30 has a slower pitch than the shafts 7, corresponding to the different graduations of the scales. It will be understood that owing to the particular construction, namely, the threading of one of the shafts 7, 7' and 30, 30' and the provision of the groove on one of the shafts as described, the possibility of simultaneously weighing in and weighing out is achieved. The device does not necessitate the use of the same weights for weighing in and for weighing out.

We claim:

1. In means for indicating the contents of each of a plurality of silo bins or like containers, operable by the movement of a weighing in and a weighing out machine associated with said containers, the combination of: two main shafts, one associated with the weighing in machine and the other associated with the weighing out machine; means for operating said main shafts through the oscillations of the weighing machines; a plurality of pairs of rotatably mounted shafts, each pair being allotted to an individual container, one shaft of each pair being adapted to be coupled to one of said main shafts and the other shaft of each pair being adapted to be coupled to the other main shaft; means for selectively coupling any shaft belonging to individual containers to the corresponding main shaft, on weighing into or out of an individual container; a pair of interengaging toothed wheels on each pair of shafts connected to move together longitudinally upon said shafts, one of said toothed wheels having screw and nut engagement with its shaft and the other of said toothed wheels being slidably but non-rotatably mounted upon its shaft; and an indicating pointer operatively connected with one of each pair of toothed wheels, substantially as described.

2. In means for indicating the contents of each of a plurality of silo bins or like containers, operable by the movement of a weighing in and a weighing out machine associated with said containers, the combination of: two main shafts, one associated with the weighing in machine and the other associated with the weighing out machine; means for operating said main shafts through the oscillations of the weighing machines; a plurality of pairs of rotatably mounted shafts, each pair being allotted to an individual container, one shaft of each pair being adapted to be coupled to one of said main shafts and the other shaft of each pair being adapted to be coupled to the other main shaft; means for selectively coupling any shaft belonging to individual containers to the corresponding main shaft, on weighing into or out of an individual container; a pair of interengaging toothed wheels on each pair of shafts connected to move together longitudinally upon said shafts, one of said toothed wheels having screw and nut engagement with its shaft and the other of said toothed wheels being slidable but non-rotatably mounted upon its shaft; an indicating pointer operatively connected with one of each pair of said toothed wheels; a pair of additional shafts permanently coupled to said two main shafts; toothed wheels upon said additional pair of shafts arranged and connected in the same manner as in the other pair of shafts; and an additional indicating device operated by said additional pair of shafts for indicating the total contents of all the containers at any time, substantially as described.

3. In means for indicating the contents of each of a plurality of silo bins or like containers, operable by the movement of a weighing in and a weighing out machine associated with said containers, the combination of: two main shafts, one associated with the weighing in machine and the other associated with the weighing out machine; means for operating said main shafts through the oscillations of the weighing machines; a plurality of pairs of rotatably mounted shafts, each pair being allotted to an individual container, one shaft of each pair being adapted to be coupled to one of said main shafts, and the other shaft of each pair being adapted to be coupled to the other main shaft; means for selectively coupling any shaft belonging to individual containers to the corresponding main shaft, on weighing into or out of an individual container; a pair of interengaging toothed wheels on each pair of shafts, connected to move together longitudinally upon said shafts, one of said toothed wheels having screw and nut engagement with its shaft and the other of said toothed wheels being slidably but non-rotatably mounted upon its shaft; and an indicating pointer operatively connected with one of each pair of said toothed wheels, said means for coupling the individual shafts to the two main shafts comprising movable friction wheels and a slidable member for selectively operating said movable friction wheels, substantially as described.

BERNT SKARAAS.
ERIK DANIELSSON.